(12) United States Patent
Wooster et al.

(10) Patent No.: US 11,789,607 B2
(45) Date of Patent: *Oct. 17, 2023

(54) DYNAMIC CONFIGURATION OF A VIRTUAL KEYBOARD

(71) Applicant: Intel Corporation, Santa Clara, CA (US)

(72) Inventors: Roland P. Wooster, Folsom, CA (US); Alexander Conrad Erdman, Rancho Cordova, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/483,339

(22) Filed: Sep. 23, 2021

(65) Prior Publication Data

US 2022/0066634 A1 Mar. 3, 2022

Related U.S. Application Data

(63) Continuation of application No. 16/808,138, filed on Mar. 3, 2020, now Pat. No. 11,216,182.

(51) Int. Cl.
*G06F 3/048* (2013.01)
*G06F 3/04886* (2022.01)
*G06F 21/32* (2013.01)
*G06F 3/04883* (2022.01)

(52) U.S. Cl.
CPC ...... *G06F 3/04886* (2013.01); *G06F 3/04883* (2013.01); *G06F 21/32* (2013.01)

(58) Field of Classification Search
CPC ... G06F 3/04886; G06F 3/04883; G06F 21/32
See application file for complete search history.

(56) References Cited

U.S. PATENT DOCUMENTS

| | | | |
|---|---|---|---|
| 5,920,303 A | 7/1999 | Baker et al. | |
| 5,963,671 A | 10/1999 | Comerford et al. | |
| 6,266,377 B1 * | 7/2001 | Velez | H04L 7/0054 |
| | | | 329/304 |
| 6,378,234 B1 | 4/2002 | Luo | |

(Continued)

OTHER PUBLICATIONS

European Search Report for EP Application No. 20214422.6 dated Jun. 2, 2021 (8 pages).

*Primary Examiner* — Hua Lu
(74) *Attorney, Agent, or Firm* — Fletcher Yoder, P.C.

(57) ABSTRACT

A system includes an electronic display to display a virtual keyboard and a processor communicatively coupled to the electronic display. In some embodiments, the virtual keyboard includes a plurality of keys. In certain embodiments, the electronic display receives a first string of erased characters and a second string of replacement characters. In certain embodiments, the processor compares the first string and the second string to determine a difference at corresponding character locations of the first string and the second string. In some embodiments, the processor increments a counter based on the comparison, the counter corresponding to a first character of the first string and a second character of the second string. In certain embodiments, the processor adjusts at least one of the plurality of keys of the virtual keyboard in response to the counter meeting a threshold.

20 Claims, 6 Drawing Sheets

(56) References Cited

U.S. PATENT DOCUMENTS

| | | | |
|---|---|---|---|
| 6,684,166 B2 | 1/2004 | Bellwood et al. | |
| 6,801,190 B1 | 10/2004 | Robinson et al. | |
| 7,151,530 B2 | 12/2006 | Roeber et al. | |
| 7,948,361 B2 | 5/2011 | Bennett et al. | |
| 8,300,023 B2 | 10/2012 | Forutanpour et al. | |
| 9,275,210 B2 | 3/2016 | Adams et al. | |
| 9,548,012 B1 | 1/2017 | Sjoberg et al. | |
| 10,275,152 B2 | 4/2019 | Fallah | |
| 11,003,839 B1* | 5/2021 | Hatch | G06F 3/04886 |
| 2002/0075240 A1 | 6/2002 | Lieberman et al. | |
| 2003/0018522 A1 | 1/2003 | Denimarck et al. | |
| 2003/0063775 A1* | 4/2003 | Rafii | G06T 7/75 382/280 |
| 2004/0183833 A1* | 9/2004 | Chua | G06F 3/0418 715/773 |
| 2004/0257238 A1 | 12/2004 | De Jongh | |
| 2005/0206730 A1* | 9/2005 | Hagiwara | G06F 3/0426 348/169 |
| 2006/0085757 A1 | 4/2006 | Andre et al. | |
| 2006/0147239 A1 | 7/2006 | Kurriss | |
| 2008/0172735 A1 | 7/2008 | Gao et al. | |
| 2009/0134972 A1 | 5/2009 | Wu et al. | |
| 2009/0183098 A1* | 7/2009 | Casparian | G06F 3/0238 341/23 |
| 2010/0079310 A1* | 4/2010 | Nachman | G06F 3/04886 345/169 |
| 2010/0281268 A1 | 11/2010 | Barreto et al. | |
| 2010/0302157 A1 | 12/2010 | Zilberman | |
| 2011/0060984 A1* | 3/2011 | Lee | G06F 40/274 715/261 |
| 2011/0078613 A1 | 3/2011 | Bangalore | |
| 2011/0234524 A1 | 9/2011 | Longe et al. | |
| 2011/0267278 A1 | 11/2011 | Wickstrom | |
| 2011/0310019 A1 | 12/2011 | Wilson | |
| 2012/0062465 A1* | 3/2012 | Spetalnick | G06F 3/0237 704/9 |
| 2012/0075192 A1* | 3/2012 | Marsden | G06F 1/1664 345/173 |
| 2012/0148115 A1 | 6/2012 | Birdwell et al. | |
| 2012/0166995 A1 | 6/2012 | McAleer | |
| 2012/0172091 A1* | 7/2012 | Kurane | G06F 3/048 345/173 |
| 2012/0260207 A1 | 10/2012 | Treskunov et al. | |
| 2013/0019191 A1* | 1/2013 | Arnold | G06F 3/04886 715/765 |
| 2013/0182015 A1 | 7/2013 | Kuo et al. | |
| 2013/0209090 A1* | 8/2013 | Rope | H04B 17/309 398/25 |
| 2013/0222247 A1 | 8/2013 | Liu et al. | |
| 2013/0275907 A1 | 10/2013 | Lau et al. | |
| 2013/0342463 A1 | 12/2013 | Murase et al. | |
| 2014/0005979 A1* | 1/2014 | Rao | G06F 11/3409 702/179 |
| 2014/0029789 A1* | 1/2014 | DeLean | G06V 10/10 382/103 |
| 2014/0052437 A1* | 2/2014 | Longe | G06F 3/0237 704/9 |
| 2014/0082514 A1* | 3/2014 | Sivaraman | G06F 3/0416 715/745 |
| 2014/0098069 A1 | 4/2014 | Tseng et al. | |
| 2014/0164973 A1 | 6/2014 | Greenzeiger et al. | |
| 2014/0168083 A1* | 6/2014 | Ellard | G06F 3/041 345/168 |
| 2014/0310639 A1* | 10/2014 | Zhai | G06F 3/0484 715/780 |
| 2014/0368445 A1 | 12/2014 | Feng | |
| 2014/0368455 A1* | 12/2014 | Croisonnier | G06F 3/045 345/173 |
| 2015/0026626 A1* | 1/2015 | Yokoyama | G06F 3/04886 715/773 |
| 2015/0293694 A1 | 10/2015 | Bozzini et al. | |
| 2015/0324117 A1* | 11/2015 | Spetalnick | G06F 3/0236 345/168 |
| 2016/0132119 A1* | 5/2016 | Temple | G06F 3/0482 345/156 |
| 2016/0171417 A1* | 6/2016 | Sankaralingham | G06F 3/04886 705/7.42 |
| 2016/0188181 A1* | 6/2016 | Smith | G06F 3/0412 715/765 |
| 2016/0246434 A1 | 8/2016 | Mizunuma | G06F 3/0416 |
| 2016/0328815 A1 | 11/2016 | Gn et al. | |
| 2016/0335531 A1* | 11/2016 | Mullen | G06K 19/06206 |
| 2017/0109780 A1 | 4/2017 | Moore et al. | |
| 2017/0153812 A1 | 6/2017 | Creager et al. | |
| 2017/0357788 A1* | 12/2017 | Ledvina | H04W 12/06 |
| 2018/0096140 A1* | 4/2018 | Bulygin | G06F 21/52 |
| 2018/0288736 A1* | 10/2018 | Raman | H04L 43/20 |
| 2020/0184053 A1* | 6/2020 | Kursun | G06V 10/764 |

\* cited by examiner

DYNAMIC CONFIGURATION OF A VIRTUAL KEYBOARD

BACKGROUND

This application is a continuation of U.S. patent application Ser. No. 16/808,138, entitled "Dynamic Configuration of a Virtual Keyboard," filed Mar. 3, 2020, which is hereby incorporated by reference in its entirety for all purposes.

The present disclosure relates generally to dynamically configuring a virtual keyboard.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Virtual keyboards are typically displayed on an electronic display, and use a digital surface to receive input similar to a traditional keyboard. For example, a virtual keyboard can receive touch-based inputs corresponding to keys on the virtual keyboard. Due to differing physical characteristics of users, a standard size, shape, and/or placement of keys on the virtual keyboard may be difficult to use by different users. For example, users with smaller hands may find keys uncomfortably far apart while users with larger hands may frequently input incorrect keys due to inadequate spacing and/or size of keys. As a result, accuracy of typing, speed of typing, and comfort can be significantly diminished for certain users of a virtual keyboard.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In an embodiment, a system includes an electronic display configured to display a virtual keyboard. In certain embodiments, the virtual keyboard includes a plurality of keys. In certain embodiments, the system also includes a processor communicatively coupled to the electronic display. In certain embodiments the processor is configured to receive a first string of erased characters, receive a second string of replacement characters, and compare the first string and the second string to determine a difference at corresponding character locations of the first string and the second string. In certain embodiments, the processor is also configured to increment a counter based on the difference, wherein the counter corresponds to a first character of the first string and a second character of the second string and adjust at least one of the plurality of keys of the virtual keyboard based on the counter meeting a threshold.

In another embodiment, a method includes receiving a set of touch data and generating a user keyboard profile based on the set of touch data. In certain embodiments, the user keyboard profile includes a configuration of a virtual keyboard. In certain embodiments, the method also includes receiving a set of biometric data and generating a user biometric profile based on the set of biometric data, wherein the user biometric profile is associated with the user keyboard profile.

In another embodiment, a method includes receiving a set of biometric data and recognizing a user based on the set of biometric data. In certain embodiments, the method also includes adjusting, based on the recognition, at least one of a plurality of keys of a virtual keyboard.

Figure 1:
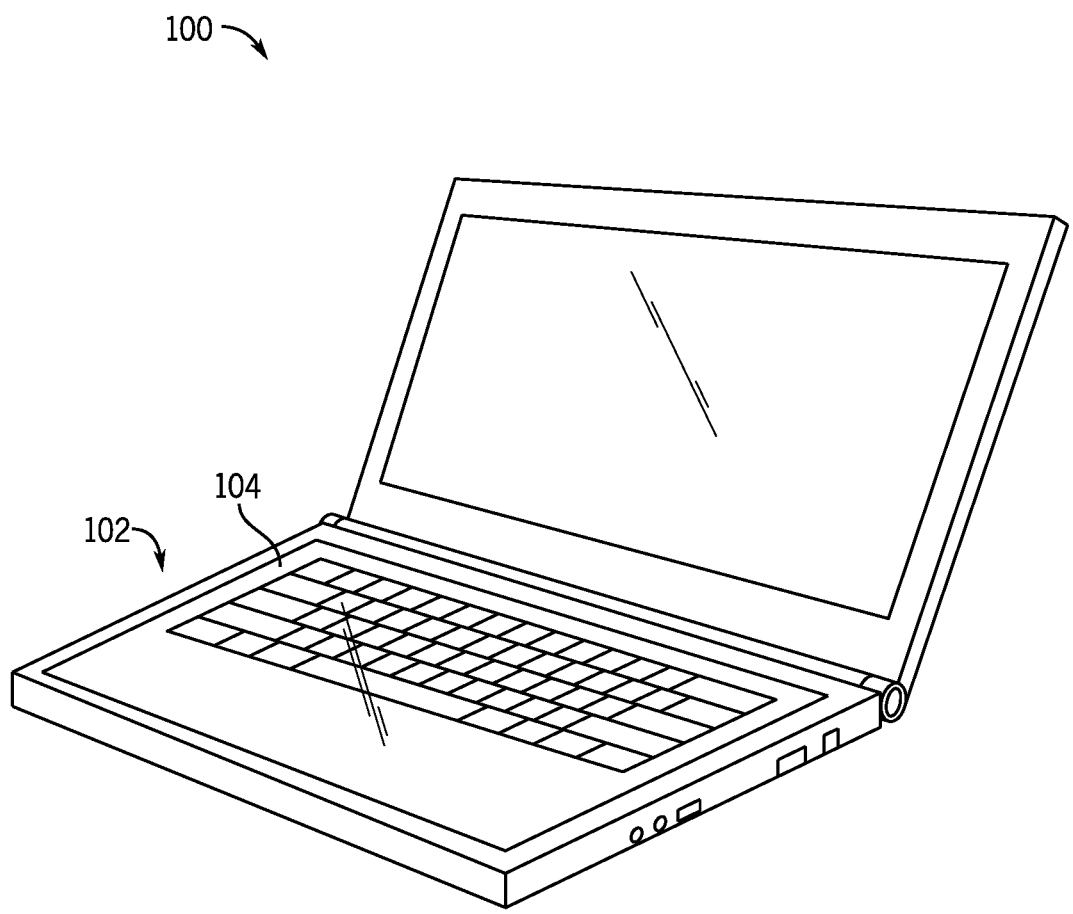
FIG. 1 is a schematic diagram of an electronic device incorporating a virtual keyboard, in accordance with an embodiment of the present disclosure.

With the preceding in mind, FIG. 1 is a schematic diagram illustrating an electronic device 100 incorporating a virtual keyboard 104 on an electronic display 102, according to embodiments of the present disclosure. In some embodiments, the electronic device 100 may be a mobile device, a laptop, a personal computer, a tablet, eReader, eWriter, a personal digital assistant, a watch, or any other suitable electronic device that may incorporate the virtual keyboard 104.

The electronic display 102 may include any suitable display technology to display the virtual keyboard 104, such as a liquid crystal display (LCD), light-emitting diode (LED) display, or organic LED display. In certain embodiments, the electronic display 102 may be a touchscreen display. For example, the electronic display 102 may include one or more sensors, such as capacitive or pressure sensors, to detect and indicate where a touch and/or pressure of a fingertip and/or writing utensil is applied to the electronic display 102. In certain embodiments, the electronic display 102 may display the virtual keyboard 104 having a set of keys, and each key of the set of keys in the virtual keyboard 104 may include one of the one or more sensors to sense when the respective key is selected. In response to receiving an indication from the one or more sensors that a key is selected, the virtual keyboard 104 may identify a character on the virtual keyboard 104 corresponding to the selected key. Alternatively, the virtual keyboard 104 may be optically projected onto a surface and/or may be displayed in a virtual reality, mixed reality, or augmented reality environment, and optical detection and analyzation of hand and finger motions may be interpreted as inputs to the virtual keyboard.

Figure 2:
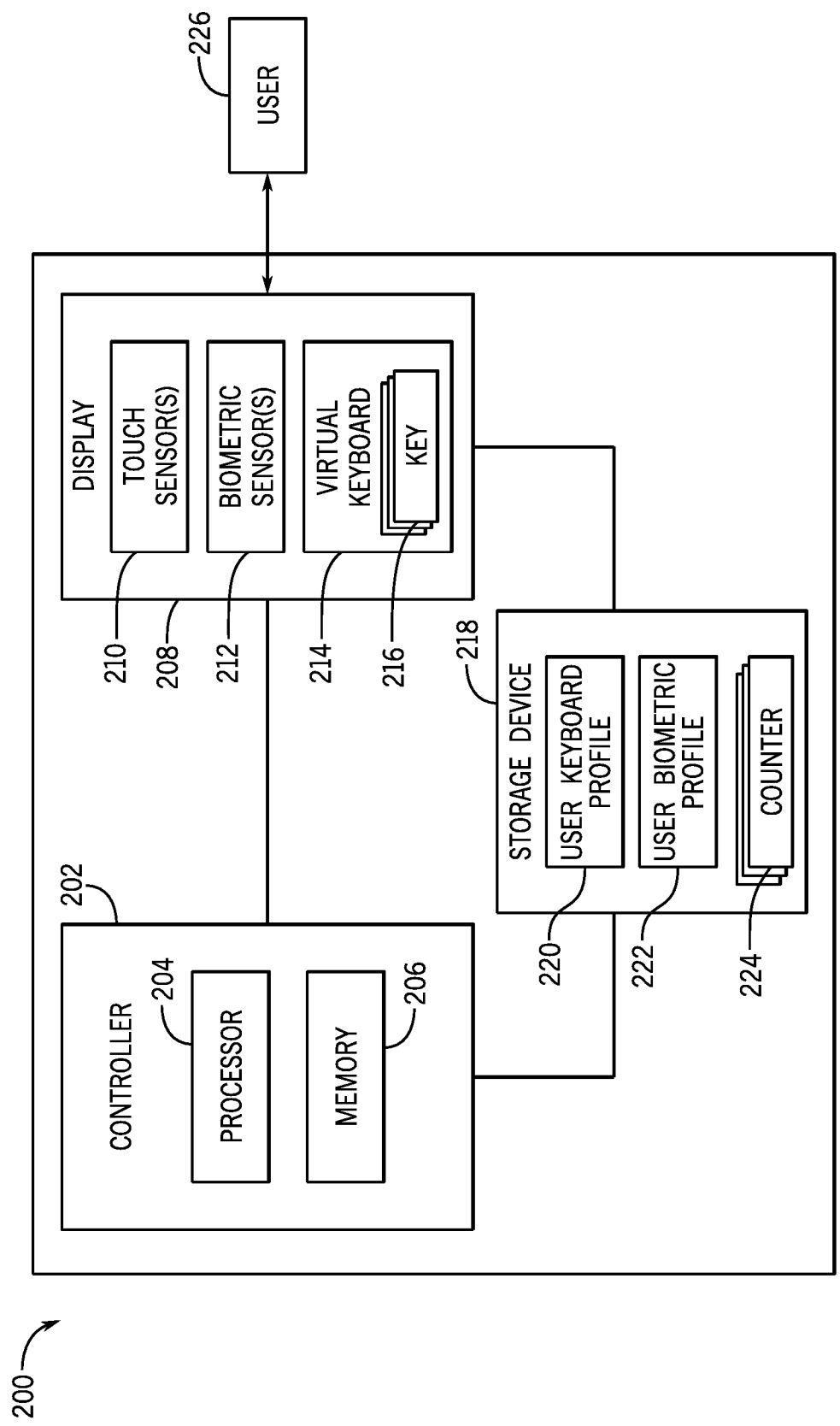
FIG. 2 is a block diagram of a virtual keyboard system, in accordance with an embodiment of the present disclosure.

FIG. 2 is a block diagram of a virtual keyboard system 200 that may be dynamically reconfigured, as described herein, according to embodiments of the present disclosure. In certain embodiments, the virtual keyboard system 200 includes a controller 202, a storage device 218, and an electronic display 208 that may generate a virtual keyboard 214, such as the electronic display 102 in FIG. 1. The controller 202 may control operation of the display 208, may process touch data acquired by a touch sensor 210, and may process biometric data acquired by a biometric sensor 212. The controller 202 may be coupled to the display 208 by any suitable techniques for communicating sensor data and control signals between the controller 202 and the display 208, such as a wireless, optical, coaxial, wired, or other suitable connection.

The display 208 may be similar to the electronic display 102 in FIG. 1. The display 208 may include any suitable number of touch sensor(s) 210 and may include any suitable number of biometric sensor(s) 212. In certain embodiments, the display 208 may be a touchscreen display. For example, the touch sensor(s) 210 may detect touch data indicating where a touch and/or pressure of a fingertip and/or writing utensil is applied to the display 208. The touch sensor(s) 210 may then transmit the touch data to the controller 202 for processing.

The biometric sensor 212 may sense or detect a biometric data (e.g., a fingerprint, face recognition information, iris recognition information, a heartrate, electrocardiogram (ECG) information, body temperature, photoplethysmogram (PPG) information, electrodermal activity (EDA)) from the user 226. For example, the biometric sensor 212 may detect biometric data from a fingerprint of the user 226. The biometric sensor 212 may then transmit the biometric data to the controller 202 for processing.

As will be appreciated, the controller 202 may include a number of elements to control operation of the display 208 and facilitate production and/or interpretation of the touch data and/or the biometric data. For instance, as illustrated, the controller 202 may include a processor 204 and a memory 206. The processor 204 may instruct the biometric sensor 212 and/or the touch sensor 210 to begin or end a sensing period. Additionally, the processor 204 may process acquired touch data and/or biometric data to generate a user keyboard profile 220 and/or a user biometric profile 222. The user keyboard profile 220 may include a configuration of keys 216 for the virtual keyboard 214. For example, the configuration may include a size, a shape, and a placement (i.e., location) for each key 216. Additionally, the processor 204 may include one or more general purpose microprocessors, one or more application specific processors (ASICS), one or more field programmable logic arrays (FPGAs), or any other processing circuitry that facilitates managing the virtual keyboard system 200.

The processor 204 may determine keys 216 of the virtual keyboard 214 that were intended to be selected by the user 226, but were inadvertently missed due to the placement of the keys 216. Moreover, the processor 204 may dynamically reconfigure the virtual keyboard 214 to place the keys 216 intended to be selected by the user 226 where the user 226 expected them to be. As such, the processor 204 may include receiving and conversion circuitry. In particular, the processor 204 may receive touch data from the touch sensor(s) 210 representing a set of touch and/or pressure indications from the user 226 and process the touch data by, for example, identifying a set of character strings corresponding to the indications. In certain embodiments, one or more of the character strings may be a set of erased characters. Additionally or alternatively, one or more of the character strings may be a set of replacement characters.

In some embodiments, the processor 204 may compare the set of character strings to determine differences at one or more character locations of the set of character strings. For example, the processor 204 may receive touch data from the touch sensor(s) 210 and process the touch data to identify a first character string of erased characters and a second character string of replacement characters. Additionally, the processor 204 may determine that the first character string and the second character string were input within a threshold time duration of less than five minutes (e.g., three minutes, one minute, thirty seconds, five seconds, and so on), which may be indicative of the user 226 selecting a key 216 (corresponding to an incorrect character in the first character string) by mistake, and correcting the mistake by deleting the incorrect key 216 and selecting a correct key 216 (corresponding to a correct character in the second character string). In certain embodiments, the threshold time duration may be less than five seconds.

In particular, the processor 204 may parse the first character string and the second character string to identify similarities and/or differences between the first character string and the second character string. For example, the first character string may be "macket" and the second character string may be "jacket". As a result, the processor 204 may identify a first character (i.e., m) of the first string and a second character (i.e., j) of the second string as a key pair corresponding to a difference between the first character string and the second character string. In certain embodiments, the processor 204 may determine that the first character string and the second character string differ at only a single position, such as the first position in the example described above. Additionally, the processor 204 may determine the characters in the key pair are located adjacent one another on a virtual keyboard 214 generated by the display 208. As a result, the processor 204 may determine that the user 226 incorrectly input the character "m" instead of the desired character "j". In certain embodiments, characters located adjacent on the virtual keyboard 214 may share at least a portion of a common border. Additionally or alternatively, characters located adjacent on the virtual keyboard 214 may have no intervening characters located between one another.

The processor 204 may monitor the touch data for repeated occurrences of the same mistyped characters. For example, the processor 204 may count each instance of a mistyped character for a key pair. In some embodiments, the processor 204 may increment a counter 224 for a key pair including the first character of the first string and the second character of the second string and store the counter 224 for the key pair in the storage device 218. In certain embodiments, the counter 224 may be stored in the user keyboard profile 220. The processor 204 may compare the counter 224 value to a threshold value and adjust the display 208 for the virtual keyboard 214 when the counter meets or exceeds the threshold value. As a result, the processor 204 may dynamically reconfigure the virtual keyboard 214 after multiple repeated mistakes, instead of after single instances of mistyped characters.

The processor 204 may continue to receive touch data from the touch sensor(s) 210 corresponding to a set of character strings. Additionally, the processor 204 may continue to increment a set of counters 224 for each key pair identified and store the set of counters 224 in the storage device 218. In certain embodiments, the processor 204 may monitor the set of counters 224 and compare a value of at least one of the set of counters 224 to a threshold value of at least ten (e.g., fifty, one hundred, one thousand, and so on). In some embodiments, the threshold value may be a dynamic threshold value, for example, starting at ten and increasing after the counter 224 reaches the dynamic threshold value. Alternatively, the processor 204 may reset the counter 224 once the threshold value is reached and begin incrementing the counter 224 again from zero. Additionally or alternatively, the processor 204 may reset the counter 224 after a threshold time duration. For example, the processor 204 may reset the counter 224 after a threshold time duration of at least one day (e.g., two days, a week, a month, and so on). As a result, the counter 224 may be reset periodically to prevent unintended reconfigurations of the virtual keyboard 214 because of a small number of errors accumulating over a long period of time into a larger number of errors which exceed a threshold value for the counter 224. After the counter meets the threshold value, the processor 204 may adjust the display 208 generating the virtual keyboard 214.

For example, the processor 204 may adjust a size, a shape, and/or a placement of at least one key 216 on the virtual keyboard 214 corresponding to one of the characters in the key pair. Additionally or alternatively, the processor 204 may adjust a size, a shape, and/or a placement of at least one key 216 on the virtual keyboard 214 corresponding to an adjacent key 216 of at least one of the characters in the key pair. After adjusting the display 208 generating the virtual keyboard 214, the processor 204 may store the adjusted display in a user keyboard profile 220 for the user 226. For example, the processor 204 may store the adjusted display as a configuration of any number of keys 216 of the virtual keyboard 214 (e.g., the keys 216 that have been reconfigured from a default key configuration of the virtual keyboard 214, or each key 216 of the virtual keyboard 214). In particular, the configuration may include a size, a shape, and a placement for any number of keys 216 of the virtual keyboard 214.

The processor 204 may associate a user biometric profile 22 with a user keyboard profile 220 in order to adjust the virtual keyboard 214 for multiple users. For example, the processor 204 may receive the biometric data from the biometric sensor 212 representing a set of finger prints for the user 226, and process the biometric data by, for example, identifying friction ridges on at least one finger of the user 226. In certain embodiments, the processor 204 may generate a user biometric profile 222 for the user 226 based on the biometric data and/or the processed biometric data and store the user biometric profile 222 in storage device 218. Additionally or alternatively, the processor 204 may associate the user biometric profile 222 for the user 226 with the user keyboard profile 220 for the user 226.

The processor 204 may determine when a change in the user 226 of the virtual keyboard system 200 occurs based on received biometric data from the biometric sensor 212. Moreover, the processor 204 may retrieve the stored user keyboard profile 220 for the user 226 and may adjust the display 208 generating the virtual keyboard 214 in response to the change in the user 226. In some embodiments, the processor 204 may receive a subsequent biometric data from the biometric sensor 212 and compare the subsequent biometric data to a set of previously received biometric data stored in a set of user biometric profiles 222. Additionally or alternatively, the processor 204 may process the subsequent biometric data and compare the processed subsequent biometric data to a set of previously processed biometric data stored in the set of user biometric profiles 222. In certain embodiments, the processor 204 may recognize a user of the virtual keyboard 214 based on the comparison. For example, the subsequent biometric data may match or correlate with one of the previously received biometric data in a corresponding user biometric profile 222. As a result, the processor 204 may receive the user keyboard profile 220 associated with the user biometric profile 222 and adjust a virtual keyboard 214 generated by the display 208 according to the user keyboard profile 220. Additionally or alternatively, the user 226 may input login information. For example, the processor 204 may recognize the user 226 based on login information received at the processor 204. The processor 204 may determine the login information corresponds to a user keyboard profile 220 and adjust the virtual keyboard 214 generated by the display 208 according to the user keyboard profile 220.

The memory 206 may include one or more tangible, non-transitory, computer-readable media that store instruction executable by the processor 204 and/or data to be processed by the processor 204. For example, the memory 206 may include random access memory (RAM), read-only memory (ROM), rewritable non-volatile memory such as flash memory, hard drives, optical discs, and/or the like. The memory 206 may store any suitable instruction to facilitate managing the virtual keyboard system 200. For example, the memory 206 may store the touch data obtained via the touch sensor 210 and/or the biometric data obtained via the biometric sensor 212 and/or algorithms utilized by the processor 204 to generate user keyboard profile(s) 220 and user biometric profile(s) 222. In some embodiments, the memory 206 may store a set of instructions and/or signal processing algorithms for the processor 204 to perform. In particular, the processor 204 may perform a signal processing algorithm on biometric data to generate a user biometric profile 222. For example, the processor 204 may perform a signal processing algorithm to identify friction ridges in a fingerprint of at least one finger of a user 214.

The storage device 218 may also include one or more tangible, non-transitory, computer-readable media that store instruction executable by the processor 204 and/or data to be process by the processor 204. For example, the storage device 218 may include random access memory (RAM), read-only memory (ROM), one or more hard drives, flash memory, or the like. The storage device 218 may store any suitable information to facilitate managing the virtual keyboard system 200. For example, the storage device 218 may store touch data and/or biometric data to be processed by the controller 202 and may store processed touch data and processed biometric data. In certain embodiments, the virtual keyboard system 200 may include additional elements not shown in FIG. 2, such as additional data acquisition and processing controls, display panels, user interfaces, and so forth.

Figure 3:
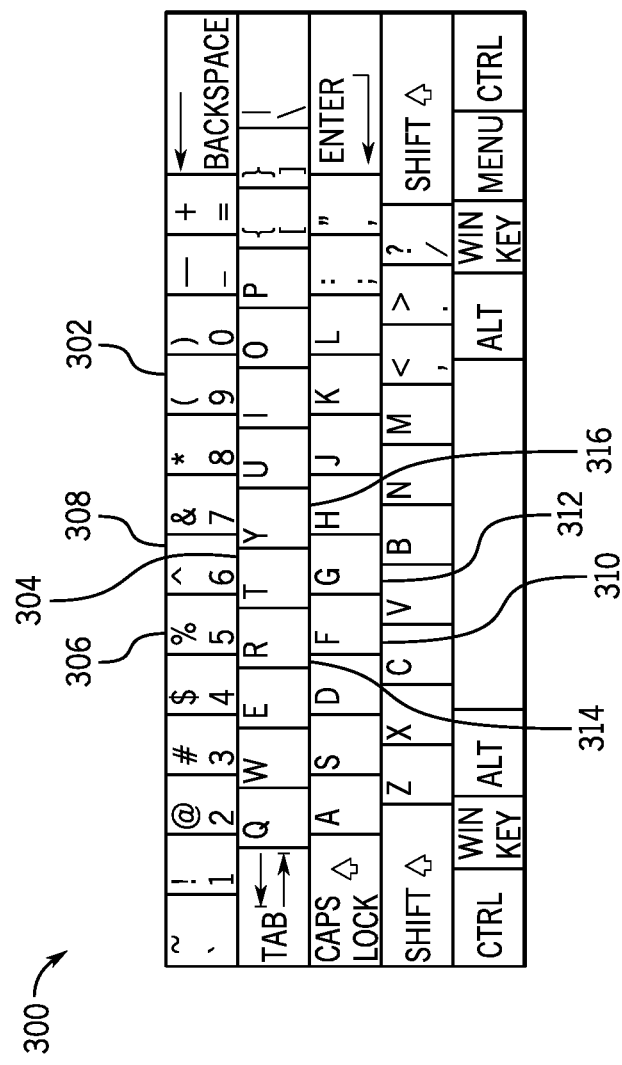
FIG. 3 is a schematic diagram of a virtual keyboard prior to reconfiguration, in accordance with an embodiment of the present disclosure.

With the preceding in mind, FIG. 3 illustrates a virtual keyboard 300 prior to reconfiguration, according to embodiments of the present disclosure. The virtual keyboard 300 may include any suitable number of keys 302, such as alphanumeric character keys, punctuation keys, navigation keys, computer function keys, and command keys. Each of the keys 302 may include or be coupled to a touch sensor, such as touch sensor(s) 210 in FIG. 2, to generate touch data based on a touch and/or pressure applied to the keys 302. In certain embodiments, prior to reconfiguration, each alphanumeric character key of the keys 302 may have a similar size and/or a similar shape. A central key may be surrounded by adjacent keys. For example, central key 304 may be surrounded by adjacent keys 306, 308, 310, 312, 314, 316. The adjacent keys may be said to share a common border (e.g., the central key 304). In particular, no intervening keys may be located between each adjacent key and the central key.

Figure 4:
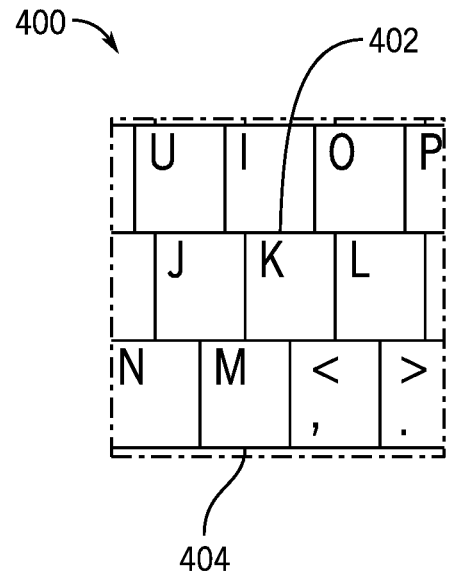
FIG. 4 is a schematic diagram of a portion of a virtual keyboard prior to reconfiguration, in accordance with an embodiment of the present disclosure.

With the preceding in mind, FIG. 4 illustrates a portion 400 of a virtual keyboard prior to reconfiguration, according to embodiments of the present disclosure. The portion 400 of the virtual keyboard may include a central key 402 and an adjacent key 404. As illustrated, the central key 402 and the adjacent key 404 may be alphanumeric character keys. In certain embodiments, the central key 402 and the adjacent key 404 may have a similar size and/or similar shape prior to reconfiguration. The central key 402 and the adjacent key 404 may be grouped into a key pair by the processor 204. In particular, each key pair may be a pair of keys that are commonly mistakenly selected in place of one another. For example, two adjacent keys (e.g., 402, 404) may form a key pair. A processor, such as processor 204 in FIG. 2, may store a counter for the key pair corresponding to the central key 402 and the adjacent key 404, and increment the counter for the key pair each time the adjacent key 404 is incorrectly input for the central key 402, as described herein.

Figure 5:
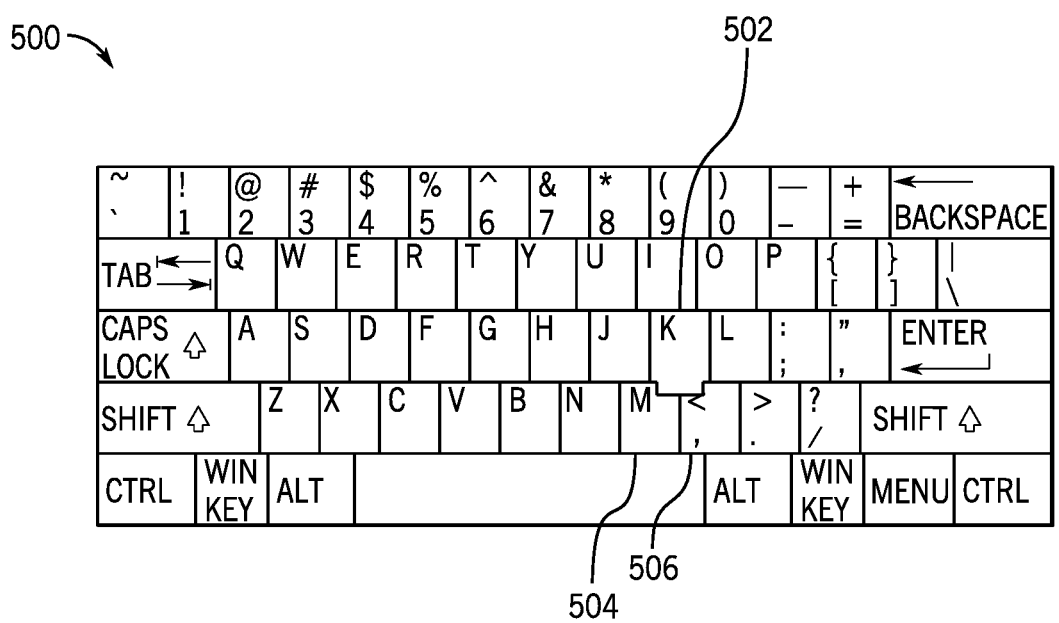
FIG. 5 is a schematic diagram of a virtual keyboard after a single instance of reconfiguration, in accordance with an embodiment of the present disclosure.

With the preceding in mind, FIG. 5 illustrates a virtual keyboard 500 after a single instance of reconfiguration, according to embodiments of the present disclosure. The virtual keyboard 500 includes a central key 502 and adjacent keys 504, 506. As illustrated, the central key and the adjacent keys 504, 506 are alphanumeric character keys. In certain embodiments, a processor, such as processor 204 in FIG. 2, may adjust and/or reconfigure a display of the virtual keyboard 500 based on a counter for a key pair including the central key 502 and an adjacent key (e.g., 504, 506) meeting a threshold value. For example, each time the user 214 mistakenly enters the adjacent key (e.g., 504, 506) instead of the central key 502, and replaces the adjacent key character in a first character string of erased characters and replaces the adjacent key character with the central key character in a second character string of replacement characters, the counter associated with the corresponding key pair may be incremented. As a result of the counter associated with the key pair meeting the respective threshold value, and as depicted in FIG. 5, the processor may increase a size (i.e., surface area) of the central key 502 and may decrease a size of the adjacent keys 504, 506. As illustrated, the processor may extend the surface area of the central key 502 in the direction of the adjacent keys 504, 506. Additionally or alternatively, the processor may only decrease a size (i.e., surface area) of the adjacent key corresponding to the character in the incremented key pair and/or increase a size of the central key.

Figure 6:
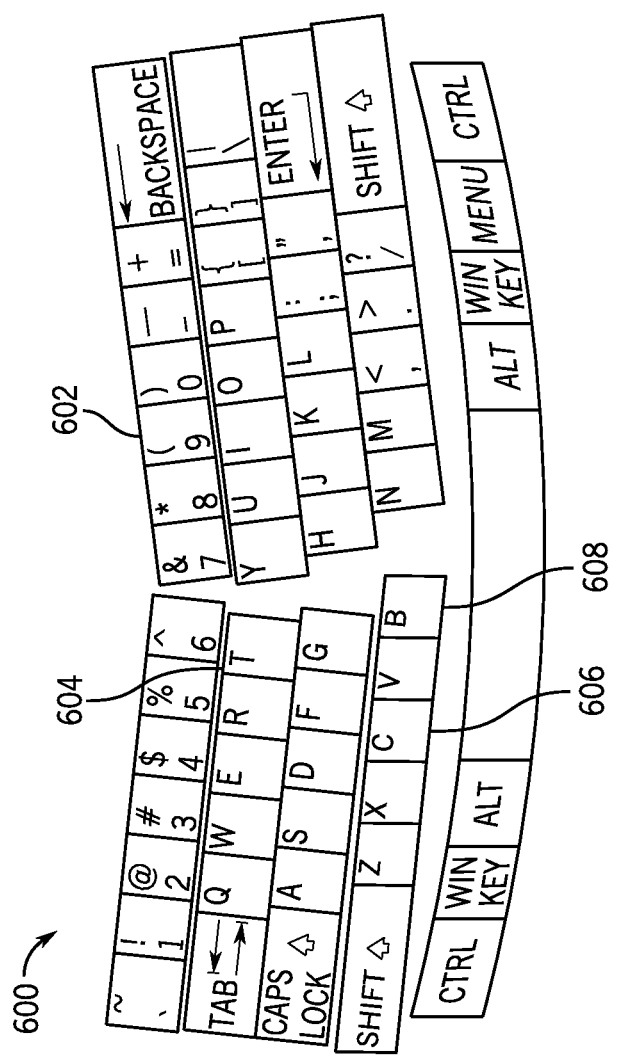
FIG. 6 is a schematic diagram of a virtual keyboard after multiple instances of reconfiguration, in accordance with an embodiment of the present disclosure.

With the preceding in mind, FIG. 6 illustrates a virtual keyboard 600 after multiple instances of reconfiguration, according to embodiments of the present disclosure. The virtual keyboard 600 includes any number of keys, such as keys 602, 604, 606, and 608. As depicted, the keys 602, 604, 606, 608 differ in size, shape, and/or placement from a standard configuration, such as virtual keyboard 300 in FIG. 3. As depicted in FIG. 6, the virtual keyboard 600 has undergone multiple instances of reconfiguration due to multiple counters associated with multiple key pairs meeting the respective threshold values. Each instance of reconfiguration may adjust a size, a shape, and a placement of one or more keys of the virtual keyboard 600. As a result, the user of the virtual keyboard 600 selects fewer and fewer incorrect keys due to the reconfiguration of the keys of the virtual keyboard 600 to meet the physical characteristics of the user.

Figure 7:
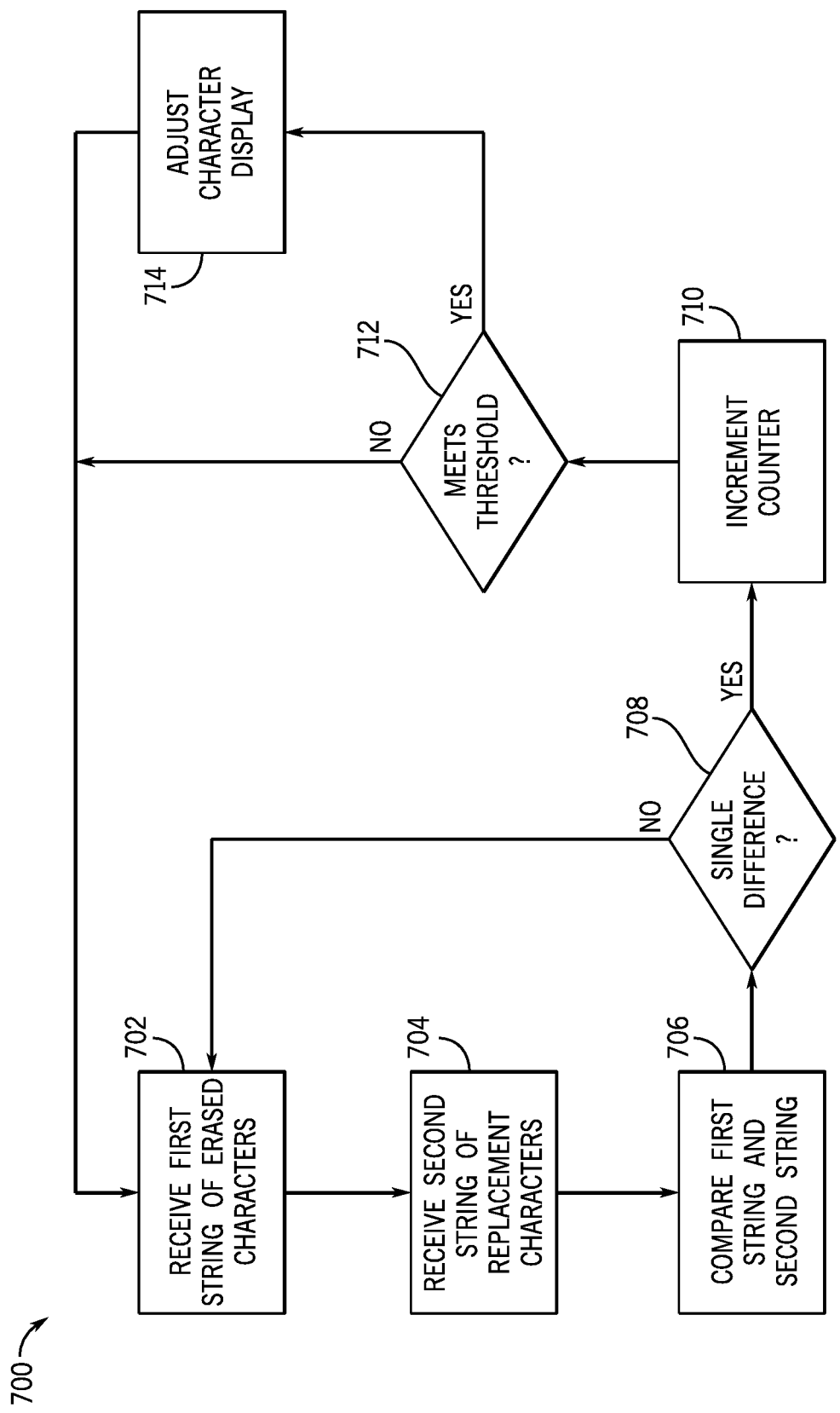
FIG. 7 is a flow diagram of a process for dynamic reconfiguration of a virtual keyboard system, in accordance with an embodiment of the present disclosure.

With the preceding in mind, FIG. 7 is a flow diagram of a process 700 for dynamic reconfiguration of a virtual keyboard, such as the virtual keyboard 104 of FIG. 1, according to embodiments of the present disclosure. While the process 700 is described as being performed by the processor 204, it should be understood that the process 700 may be performed by any suitable device that may control and/or communicate with components of the virtual keyboard system 200. Furthermore, while the process 700 is described using steps in a specific sequence, it should be understood that the present disclosure contemplates that the described steps may be performed in different sequences than the sequence illustrated, and certain described steps may be implemented by executing instructions stored in a tangible, non-transitory, computer-readable medium, such as the memory 206, using any suitable processing circuitry, such as the processor 204.

In this process 700, a user, such as user 226 in FIG. 2, may be typing on a virtual keyboard, such as virtual keyboard 214, and incorrectly input a character in a character string and subsequently replace the incorrect character with the correct character by erasing the character string or a portion of the character string. As a result of the typing and interaction with the virtual keyboard, a set of touch data is generated and transmitted, for example, by the touch sensor (s) 210 of FIG. 2. In some embodiments, the set of touch data is received at a processor, such as the processor 204 of FIG. 2. Additionally, the processor 204 may process the set of touch data to generate a set of character strings. In certain embodiments, the set of character strings may include a first string of erased characters associated with the incorrectly input character string. The first string of erased characters is received (step 702), for example, at processor 204 of FIG. 2.

After incorrectly typing the first string, the user may delete the first character string and input a second, corrected character string. In some embodiments, the processor 204 may process a second set of touch data to generate a second set of character strings including the second character string. Additionally or alternatively, the first set of character strings may include the second string of replacement characters. The second string of replacement of characters is generated and transmitted, for example, by the touch sensor(s) 210 of the display 208 in FIG. 2. The second string of replacement characters is received (step 704), for example, at processor 204 of FIG. 2.

Next, the processor 204 may determine a mistyped character and an intended character by comparison between the first string and the second string. The first string and the second string are compared (step 706), for example, at and/or by the processor 204 of FIG. 2, to determine the mistyped character. In particular, the processor 204 identifies a character at each location of the first string and the second string. In certain embodiments, the processor 204 may group the characters at a same location in the first string and the second string. For example, the processor 204 may group the characters at the first location in a first group, may group the characters at the second location in a second group, and so on. Additionally, the processor 204 may analyze the groupings of the characters to determine whether any differences exist between the characters in the group. For example, the processor 204 may determine a first character from the first string in the first group and a second character in the second string in the first group differ. In certain embodiments, the processor 204 may determine whether the differing characters in the group are located adjacent one another on the virtual keyboard, such as virtual keyboard 300 in FIG. 3. For example, the processor 204 may determine the differing characters are adjacent characters on a virtual keyboard and determine the differing characters correspond to a mistyped character (i.e., deleted character) and an intended character (i.e., replacement character).

In order to verify that the mistyped character was a mistake associated with a mistyped character and not a choice by the user to replace a character string altogether, the processor determines whether only a single difference exists between the first string and the second string based on the comparison (step 708). For example, the processor 204 may determine only a single difference exists in the groups of characters formed from the first string and the second string. As a result, the processor may increment a counter corresponding to a key pair for the first character and the second character (step 710). Additionally, the processor may store the counter for the key pair in the user keyboard profile for the user.

The processor determines whether the counter for the key pair meets a threshold value (step 712). In certain embodiments, the threshold may be a dynamic threshold which increases each time the dynamic threshold is met. For example, a value for a dynamic threshold may begin at an initial value of ten and increase to a subsequent value of one hundred after the counter reaches the initial value. In certain instances, the dynamic threshold may increase exponentially. As a result, the processor 204 may adjust the virtual keyboard more frequently towards a beginning of a user's use of the virtual keyboard.

Next, the processor may adjust a configuration of the keys on the virtual keyboard in order to better accommodate a user making frequency mistakes for a specific key pair. The processor adjusts or instructs the display to adjust at least one key of the virtual keyboard (step 714). In some embodiments, the processor may adjust a size, a shape, a placement, or any combination thereof for the at least one key. Additionally or alternatively, the processor may adjust a size, a shape, a placement, or any combination thereof for one or more adjacent keys of a central key in the key pair. The electronic display generating the virtual keyboard may adjust other keys of the virtual keyboard accordingly to display the adjusted size, shape, and/or placement of the keys of the virtual keyboard.

In certain embodiments, process 700 may include additional steps. In certain embodiments, the processor may generate a user biometric profile to identify a user of the virtual keyboard and store a configuration of the virtual keyboard in a user keyboard profile associated with the user biometric profile. For example, a biometric sensor, such as biometric sensor 212 in FIG. 2, may generate and transmit a set of biometric data for a user. In some embodiments, a processor, such as processor 204 in FIG. 2, may receive the set of biometric data and may process the biometric data. The processor may compare the set of biometric data to a set of biometric data stored in a user biometric profile, such as user biometric profile 222 in FIG. 2, and recognize a user of the virtual keyboard based on the comparison. Additionally, the processor may adjust at least one key of the virtual keyboard based on the recognition. For example, the processor may adjust at least one key of the virtual keyboard to match or correlate with a configuration included in a user keyboard profile associated with the recognized user biometric profile. Additionally or alternatively, the processor may process the set of biometric data received from the biometric sensor, may generate a new user biometric profile, and may store the new user biometric profile in a storage device, such as storage device 218 in FIG. 2.

While only certain features of the disclosure have been illustrated and described herein, many modifications and changes will occur to those skilled in the art. For example, while the embodiments described herein include reconfiguration of virtual keyboard systems, substantially similar benefits provided by the present invention may be provided to similar virtual display systems for other types of controls. For example, virtual control systems for audio engineering, operation of virtual musical instruments, graphic design, augmented reality, virtual reality, and any other suitable virtual display systems may be reconfigured using the systems and methods described herein.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

What is claimed is:

1. A device, comprising:
 a touchscreen configured to:
  display a virtual keyboard comprising a plurality of keys; and
  receive an input via a first key of the plurality of keys; and
 at least one processor communicatively coupled to the touchscreen, the at least one processor configured to:
  receive an erased character based on the input via the first key of the plurality of keys;
  receive a replacement character associated with a second key of the plurality of keys;
  increment a counter based on the erased character, the replacement character, or both, wherein the counter corresponds to the erased character, the replacement character, or both;
  adjust at least one key of the plurality of keys of the virtual keyboard based on the counter meeting a dynamic threshold;
  update the dynamic threshold based on a number of instances the at least one key is adjusted; and
  reset the counter when a threshold time duration is reached and the counter is below the dynamic threshold.

2. The device of claim 1, wherein adjusting the at least one key of the plurality of keys comprises altering a shape of the first key of the virtual keyboard.

3. The device of claim 1, wherein adjusting the at least one key of the plurality of keys comprises altering a placement of the first key on the virtual keyboard.

4. The device of claim 1, wherein adjusting the at least one of the plurality of keys of the virtual keyboard comprises altering a size of the at least one of the plurality of keys, a shape of the at least one of the plurality of keys, or both.

5. The device of claim 1, wherein the at least one processor is configured to determine that a first location on the virtual keyboard corresponding to the erased character is located adjacent to a second location on the virtual keyboard corresponding to the replacement character.

6. The device of claim 1, wherein the at least one processor is configured to adjust a configuration of the plurality of keys of the virtual keyboard.

7. The device of claim 1, wherein adjusting the at least one key of the plurality of keys of the virtual keyboard comprises altering a placement of the at least one key of the plurality of keys on the virtual keyboard.

8. The device of claim 1, wherein the at least one processor is configured to:
    determine an elapsed time between receiving the erased character and receiving the replacement character; and
    increment the counter based on determining the elapsed time falls within the threshold time duration.

9. The device of claim 1, comprising a biometric sensor configured to generate a set of biometric data, wherein the at least one processor is configured to:
    receive the set of biometric data;
    identify a user based on the set of biometric data; and
    adjust the at least one of the plurality of keys of the virtual keyboard based on the user.

10. One or more tangible, non-transitory, computer-readable media comprising instructions that, when executed, are configured to cause processing circuitry to perform operations comprising:
    receiving, via a virtual keyboard, an erased character associated with a first key;
    receiving, via the virtual keyboard, a replacement character associated with a second key;
    incrementing a counter based on the erased character, the replacement character, or both, wherein the counter corresponds to the erased character, the replacement character, or both;
    adjusting the first key based on the counter meeting a dynamic threshold;
    updating the dynamic threshold based on a number of instances the first key is adjusted; and
    resetting the counter when a threshold time duration is reached and the counter is below the dynamic threshold.

11. The one or more tangible, non-transitory, computer-readable media of claim 10, the operations comprising:
    comparing a first location associated with the erased character and a second location associated with the replacement character.

12. The one or more tangible, non-transitory, computer-readable media of claim 11, the operations comprising adjusting a configuration of the virtual keyboard based on comparing the first location and the second location.

13. The one or more tangible, non-transitory, computer-readable media of claim 12, wherein adjusting the configuration of the virtual keyboard comprises altering a size of the first key of the virtual keyboard.

14. The one or more tangible, non-transitory, computer-readable media of claim 13, wherein the first key is associated with the erased character.

15. The one or more tangible, non-transitory, computer-readable media of claim 13, wherein adjusting the configuration of the virtual keyboard comprises altering a size of the second key of the virtual keyboard.

16. The one or more tangible, non-transitory, computer-readable media of claim 13, wherein the second key is associated with the replacement character.

17. A system, comprising:
    an electronic display configured to display a virtual keyboard; and
    at least one processor communicatively coupled to the electronic display, the at least one processor configured to:
        receive a first character associated with a first key of the virtual keyboard;
        receive a second character associated with a second key of the virtual keyboard;
        increment a counter based on the first character, the second character, or both, wherein the counter corresponds to the first character, the second character, or both;
        adjust the first key based on the counter meeting a dynamic threshold;
        update the dynamic threshold based on a number of instances the first key is adjusted; and
        reset the counter when a threshold time duration is reached and the counter is below the dynamic threshold.

18. The system of claim 17, wherein the at least one processor is configured to:
    compare a first location of the first key and a second location of the second key.

19. The system of claim 18, wherein the at least one processor is configured to determine the first location is adjacent the second location based on comparing the first location and the second location.

20. The system of claim 18, wherein the at least one processor is configured to determine the first key is adjacent the second key based on comparing the first location and the second location.

* * * * *